United States Patent [19]
Kobayashi et al.

[11] Patent Number: 6,142,294
[45] Date of Patent: Nov. 7, 2000

[54] PLASTIC CONVEYOR BELT AND CONVEYOR APPARATUS USING THE SAME

[75] Inventors: Shogo Kobayashi, Fuji; Kazuya Yoshida, Tokyo, both of Japan

[73] Assignees: Kobayashi Engineering Works Ltd.; Nippon Filcon Co., Ltd., both of Japan

[21] Appl. No.: 09/089,362

[22] Filed: Jun. 3, 1998

[51] Int. Cl.$^7$ .................................................. B65G 17/06
[52] U.S. Cl. ........................................ 198/848; 198/853
[58] Field of Search ..................... 198/848–853

[56] References Cited

U.S. PATENT DOCUMENTS

| | | | |
|---|---|---|---|
| 540,199 | 5/1895 | Taggart | 198/849 |
| 4,901,844 | 2/1990 | Palmaer et al. | 198/852 |
| 5,139,135 | 8/1992 | Irwin et al. | 198/852 |
| 5,271,491 | 12/1993 | Irwin | 198/852 |
| 5,566,817 | 10/1996 | Meeker | 198/848 |
| 6,036,002 | 3/2000 | Kobayashi et al. | 198/853 |

*Primary Examiner*—Christopher P. Ellis
*Assistant Examiner*—Mark A. Deuble
*Attorney, Agent, or Firm*—Rader, Fishman&Grauer

[57] ABSTRACT

To provide a conveyor belt which is light in weight, easy to clean, free from rust, and easy to manufacture, a plastic conveyor belt is formed in an endless shape, by sequentially coupling belt constituent units, each of which comprises a cranked connection piece formed by joining horizontal portions of two plates each having an L-shaped cross section such that vertical portions of the two plates are not located on the same side, a rod which is connected integrally with an inner vertical portion of the connection piece, and has a core-sheath structure consisting of a metal core portion and a plastic sheath portion, a connection shaft provided on one portion of the connection piece, and a connection piece having a connection hole formed in a portion of the connection piece where the connection shaft is not provided. The belt constituent units are coupled with each other by bringing the vertical portion of the connection piece into contact with a cranked stepped portion of another connection piece, and inserting the connection shaft into the connection hole such that the connection shaft is freely rotatable. The present invention also provides a conveyor apparatus comprising this conveyor belt and a sprocket.

19 Claims, 7 Drawing Sheets

PLASTIC CONVEYOR BELT AND CONVEYOR APPARATUS USING THE SAME

BACKGROUND OF THE INVENTION

The present invention relates to a conveyor belt produced using a plastic, such as acetal resin, polypropylene, or ABS resin, and a conveyor apparatus which includes such a conveyor belt.

Conventionally, various kinds of conveyor belts for transportation have been available which include those composed of a woven fabric, those composed of a fabric coated with a resin, those formed from a spiral wire material, those produced by combining a spiral wire material and rods, those produced by inserting rods through belt constituent unit pieces, and sequentially connecting adjacent ones of the belt constituent unit pieces with each other, and those produced by sequentially connecting end portions of rods with each other. These conveyor belts have been used depending upon applications, in view of their advantages and disadvantages.

In a conveyor belt formed by inserting rods through connection holes of belt constituent pieces each formed by bending a plate into U-like shape, and a conveyor belt produced by sequentially connecting end portions of rods with each other, a conveyor surface or carrying surface is formed by the rods, and therefore large space can be easily obtained, assuring a high efficiency with which the carrying surface is cleaned. Thus, these kinds of conveyor belts have been widely used for such applications as cooling, drying and cleaning.

Further, the rods can engage with teeth of a sprocket, and therefore the belt conveyors can be driven by the sprocket.

When driven by a sprocket, the belt conveyor is prevented from slipping, and can be driven without applying large tensile force to the belt. This advantageously eliminates a need to increase the strength of a conveyor apparatus including rolls.

SUMMARY OF THE INVENTION

The conventional conveyor belts are often made of a metal, such as stainless steel, taking account of the strength, efficiency or easiness in manufacturing, corrosion resistance during its use, and others.

To ensure a sufficiently high strength of a carrying surface of a conveyor belt, rods and belt constituent unit pieces of the belt are made of a metal, such as stainless steel, in most cases. Where the belt constituent unit piece is formed by bending a plate into shape, or where the conveyor belt is formed by sequentially connecting end portions of adjacent rods to each other by winding, a metal is used for the belt constituent unit pieces and rods because the material must be plastically deformed during bending or winding.

Although a metallic conveyor belt is excellent in its strength, it is very heavy, and suffers from poor handling ease when it is installed, removed or repaired. Even when stainless steel is used, occurrence of rust cannot be completely avoided.

To prevent the rods from slipping out of the belt constituent unit pieces, each rod must be welded, hooked or bent so as to be fixed during manufacture of the belt, thus requiring much time and labor.

In view of the above problems encountered in the prior art, the object of the present invention is to provide a conveyor belt which is light in weight, easy to handle, free from rust, and can be easily produced, and a conveyor apparatus using such a conveyor belt.

The present invention relates to a plastic conveyor belt formed in an endless shape by sequentially coupling belt constituent units, each of which comprises a cranked connection piece formed by joining horizontal portions of two plates each having an L-shaped cross section such that vertical portions of the two plates are not located on the same side, a rod which is connected integrally with an inner vertical portion of the connection piece, and has a core-sheath structure consisting of a metal core portion and a plastic sheath portion, a connection shaft provided on one portion of the connection piece, and a connection piece having a connection hole formed in a portion of the connection piece where the connection shaft is not provided, the belt constituent units being coupled with each other by bringing the vertical portion of the connection piece into contact with a cranked stepped portion of another connection piece, and inserting the connection shaft into the connection hole such that the connection shaft is freely rotatable.

The plastic conveyor belt may comprise a combination of belt constituent unit pieces each of which has a connection piece having connection shafts provided on opposite sides of inner and outer portions thereof, and belt constituent unit pieces each of which has a connection piece having connection holes formed in the inner and outer portions thereof so as to face in opposite directions.

In the plastic belt conveyor as described above, a projection having a diameter larger than that of the connection hole may be formed at a distal end of the connection shaft formed integrally with the connection piece. Also, the connection piece and the connection shaft of the plastic conveyor belt may be connected to each other by engaging a projecting portion formed on the connection hole of the connection piece with a recessed portion formed in an insertion portion of the connection shaft in such a manner that the connection shaft is freely rotatable.

On the other hand, a projecting portion formed on the connection hole of the connection piece may be located at an end portion of the connection hole, and an engaging recessed portion formed in the connection shaft is located at a root of a projection formed at a distal end of the connection shaft.

In the plastic conveyor belt of the present invention, the connection piece and the connection shaft may be connected to each other by engaging a recessed portion formed in the connection hole of the connection piece with a projecting portion formed on the connection shaft in such a manner that the connection shaft is freely rotatable. Also, the connecting hole of the connection piece may be formed with a cutout which is continuous to the connection hole and a surface of a side face of the connection piece.

In addition, the plastic conveyor belt may be formed as an endless belt by projecting an end portion of the rod outward from the connection piece, the rod being joined integrally with the inner portion of the connection piece, and sequentially inserting the projecting portion as the connection shaft into a connection hole formed in an outer portion of another connection piece such that the connecting shaft is freely rotatable. It is also possible to form a plastic conveyor belt in a curved shape, such that a distance between the connection shaft and the connection hole of the connection piece on the side of one edge of the conveyor belt is made larger than a distance on the side of the other edge of the belt.

In the plastic conveyor belt of the present invention, the connection piece and the connection shaft may be formed as separate members, and the connection hole may be formed at each of inner and outer portions of the connection piece, the connection piece being combined with the connection shaft. In this case, the connection piece is coupled with the connection shaft formed as a separate member, by inserting one of two protrusions formed in the vicinity of an end portion of the separately formed connection shaft, into the connection hole, using elastic deformation of at least one of the protrusion and the connection hole, during insertion of the connection shaft, and sandwiching the connection pieces between the protrusion on the outer side and the protrusion on the inner side such that the connection pieces is freely rotatable.

In the plastic conveyor belt of the present invention, the rod having the core-sheath structured may be formed by inserting a metal rod into a plastic pipe that provides a plastic sheath.

The present invention also provides a conveyor apparatus comprising the plastic conveyor belt as described above, and a sprocket that engages with the rod of the belt.

The present invention relates to a conveyor belt wherein each connection piece is formed of a plastic material, and each rod has a core-sheath structure in which a core is made of a metallic material and a sheath is made of a plastic material. The connection piece and the rod are formed into an integral belt constituent unit piece, and a plurality of belt constituent unit pieces thus produced are coupled with each other by means of connection shafts.

Since most of the materials forming the conveyor belt are plastics, the conveyor belt is light in weight, easy to handle, and does not suffer from rust.

Compared with the case where a heavy metallic belt is used, a conveyor apparatus including rolls and frames need not have a high strength, and therefore the weight and size of the apparatus can be reduced. Unlike the conventional conveyor belt which is heavy and difficult to drive, the conveyor belt of the present invention can be easily driven even if it has large width and length. Further, since the rod has a core-sheath structure in which the core is made of a metal, the conveyor belt is light in weight and has high flexural strength, thus ensuring sufficiently high strength of its carrying surface.

In the present invention, the connection shaft of one connection piece engages with the connection hole formed in another connection piece so that adjacent belt constituent unit pieces are coupled or connected with each other, while preventing relative movements of the connection pieces and the connection shaft in the width direction. The belt constituent unit piece is freely rotatable about an axis of the connection shaft.

A conventional metallic conveyor belt is assembled by welding its components.

In the present invention, the connection piece is formed in cranked shape by joining the horizontal portions of two plates each having an L-shaped section in such a manner that their vertical portions are not located on the same side. This is because a cranked stepped portion of one connection piece can be brought into contact with a vertical portion of another connection piece, so that end portions of a conveyor, or end portions of a conveyor surface, are formed straight without including protrusions and recesses, thus permitting smooth transportation and rotation.

The rod, connection shafts and the connection pieces are integrated with each other, so as to reduce the number of components of the conveyor to be assembled, and make it fast to assemble the components into the conveyor. Further, the strength of the conveyor is increased, and the position of the conveyor during transportation can be maintained with high stability, thus eliminating so-called rattling and increasing the service life of the conveyor.

The provision of the connection shafts does not result in an increase in the weight of the conveyor belt, since it suffices that the connection shaft has a length enough to connect adjacent connection pieces.

When the belt constituent unit pieces are connected to each other by means of the connection shafts, the metal cores of the rods are not exposed to the outside, and rusting of the cores can be thus avoided.

Since the connection shaft is rotatably inserted into the connection hole, the endless rotation of the conveyor is carried out smoothly.

The connection shaft is provided on one portion of the connection piece to which the rod is joined, or the other portion, and the connection hole is formed in a portion of the connection piece on which the connection shaft is not provided.

The connection shafts may be provided on opposite sides of both the inner and outer portions of the connection piece, and the connection holes may be formed in both the inner and outer portions of another connection piece to be connected. The connection shaft is made of a metal or a plastic, and preferably has a core-sheath structure consisting of a metal core and a plastic sheath, to assure high strength and increased ease in joining the shaft to the connection piece.

Alternatively, the connection hole may be formed in both portions of the connection piece, and connection shafts formed separately from the connection piece may be inserted into the connection holes. However, the connection shaft is preferably integrated with the connection piece, so as to reduce the number of parts to be assembled, and make it easy and fast to assemble the parts together.

A straight conveyor belt is formed by controlling the distance between the connection shafts and the connection holes of the connection pieces to be equal at both ends of the conveyor belt. A curved conveyor belt is formed by controlling the distance between the connection holes and the connection shafts of the connection pieces at one end of the belt to be larger than that at the other end of the belt. These straight and curved conveyor belts can be suitably used to provide a desired conveyance path.

Further, the connection shaft may be inserted into the connection hole by elastically deforming a projecting portion or recessed portion formed on the inner surface of the connection hole, and a projecting portion or recessed portion formed on the connection shaft, so as to connect the belt constituent unit pieces to each other. For instance, continuous recessed portions may be formed in the inner circumferential wall of the connection hole of the connection piece in a circumferential direction, and discontinuous projecting portions may be formed on the outer circumferential surface of the connection shaft in a circumferential direction. Although the projecting portions are not necessarily formed discontinuous, discontinuous projecting portions are advantageous in favor of easy engagement and smooth rotation. Conversely, discontinuous projecting portions may be formed on the inner circumferential wall of the connection hole of the connection piece in a circumferential direction, and continuous projecting portions may be formed on the outer circumferential surface of the connection shaft in a circumferential direction.

A projection having a larger diameter than the diameter of the connection hole may be formed at a distal end of the connection shaft. This projection may be pushed into the connection hole, and protruded out of the hole utilizing elastic deformation, so that the connection shaft engages with the connection hole.

When a projecting portion is formed on an end portion of the connection hole, to be engaged with an engaging recessed portion formed at the root of the projection formed at the end of the connection shaft, to thus connect the belt constituent units, the projecting portion at the end of the connection shaft can be deformed toward the recessed portion, thereby making easy to cause elastic deformation and connect the belt constituents units to each other.

While the connection shaft can be easily pushed in if the diameter of its distal end is reduced, the shaft can be also easily pushed through the hole if a notch is formed at the distal end of the shaft.

As for the diameters of the connection shaft and the connection hole, the projecting portion formed on the connection shaft has the largest diameter, and the connection hole has an intermediate diameter, while the diameter of the connection shaft is smaller than the inside diameter of the connection hole.

It is desirable that the connection piece and the connection shaft are made of different plastic materials which differ in hardness, since one of these components made of a softer material undergoes compressive deformation, and chipping of their projecting portions can be avoided upon engagement of these components.

Which one of the connection piece and connection shaft is made of a hard material or soft material is not particularly limited, but the connection shaft is preferably made of a hard material so as to improve the strength of the connection shaft.

For example, the connection piece is made of a polyacetal resin, and the connection shaft is made of an ABS resin.

When the connection hole is formed with a cut-out that is continuous to the side face of the connection piece, the connection shaft can be elastically deformed and fitted in the hole through the cut-out.

The connection pieces are coupled with each other by engaging the connection shaft with the connection hole utilizing elastic deformation. Namely, the connection shaft and connection hole engage with each other at certain engaging positions, making use of flexible expansion of the connection hole due to elastic deformation, and compressive contraction of the connection shaft due to elastic deformation.

Although the connection hole and the connection shaft cannot engage with each other as they maintain their original dimensions, the connection shaft may be pushed into the hole under a pressure toward the engaging position, thereby to cause elastic deformation and achieve engagement at the engaging position.

Needless to say, the elastic deformation is canceled or eliminated at the point of time when the engagement between connection shaft and the connection hole is established at a certain position. Also, a clearance or gap exists between the engaging portions of the connection shaft and the connection piece, so that these components can be freely rotated relative to each other.

The conveyor belt of the present invention does not need to be welded unlike the convention metal conveyor belt, and has a reduced number of components. Thus, the conveyor belt can be assembled by one-touch operation, and easily repaired. Even when a single rod or connection shaft is broken, for example, the conveyor belt can be repaired by disassembling and replacing only the broken belt constituent unit by a new one.

This is possible because the contact surfaces of the rod, the connection shaft and the connection hole are made of plastics.

Namely, it is important to notice that the elastic deformation of plastics occurs within a large range, and the plastics have certain degrees of strength, hardness and rigidity, and a small coefficient of friction.

Metals are difficult to engage with other components or disassemble due to a small range of elastic deformation, and are easily deformed permanently.

A material which is elastically deformed to a great extent but has considerably small strength or rigidity cannot be used for forming the connecting pieces and shafts, since their connecting portions show low strength. A material having a large friction coefficient is also undesirable since it makes it difficult to push in the connection shaft and engage the shaft with the hole. Even if the engagement is possible, the connection shaft and connection piece thus engaged cannot smoothly rotate relative to each other. For these reasons, soft rubbers or the like are not preferred.

When the connection pieces are coupled with each other, the projecting portion of the connection shaft is compressed and pushed in against the inner wall of the connection hole, to pass through the connection hole.

The required amount of elastic deformation may be controlled to a suitable value, depending upon the diameters of the connection hole and the connection shaft, physical properties of plastics used, the force with the connection shaft is pushed into the hole for engagement therewith, and the strength of the engaging portions.

The connection shafts may not be used and the belt constituent unit pieces may be connected to each other by means of rods. In this case, the end portion of the rod is caused to project outward from the inner portion of the connection piece, and inserted into the connection hole formed in the outer portion of a connection piece to be connected. Like the connection shaft, the end portion of the rod that protrudes outward may be provided with a projecting portion or recessed portion, to ensure engagement of the connection pieces.

Although the number of parts is reduced when the rod is used as the connection shaft, an increased load is applied to the rod, which requires the use of a rod having a large diameter and increased strength, resulting in an increase in the weight of the conveyor belt.

When the connection shaft is formed as a separate member, two projections are formed near the opposite end portions of the connection shaft at an interval two times as large as the thickness of the connection piece. Upon insertion of the connection shaft, the outer projection is inserted into the connection hole by elastically deforming one or both of the projection and the connection hole, and projected out of the connection hole of the outer connection piece, so that two connection pieces are gripped between the outer projection and the inner projection.

Since the inner projection of the connection shaft only prevents the inward movement of the connection piece, and does not need to pass through the connection hole, the diameter of the projection can be freely determined if it is large enough to prevent the connection shaft to pass through the connection hole. As a matter of course, the inner and outer projections may be reversed.

Three projections may be formed on the connection shaft at intervals equal to the thickness of the constituent unit piece. Upon insertion of the connection shaft, the outer projection may be elastically deformed, to be projected outward from the outer connection piece, and the inner projection may be projected inward from the inner connection piece, while the outer connection piece may be held between the outer projection and the intermediate projection, and the inner connection piece may be held between the intermediate projection and the inner projection.

Auxiliary rods may be provided between rods, or a spiral wire material may be hung over the rods. The auxiliary rods or spiral wire material can provide a closely or finely divided conveyor surface, thus making it possible for the conveyor belt to carry small things.

A conveyor apparatus which uses the conveyor belt of the present invention may be constructed such that the conveyor belt is hung or extended over rolls. Since only intermediate portions of the rods form a belt portion of the conveyor belt, the rods may engage with a sprocket. While other aspects are not particularly limited, the conveyor belt is preferably driven by the sprocket which engages with the rods at the same pitch, so as to prevent slipping of the belt.

The conveyor apparatus as described above provides large space, and can therefore widely used in various applications, such as cleaning, drying and cooling. For example, the conveyor apparatus can be suitably used as a conveyor for cooling breads.

DETAILED DESCRIPTION OF THE PREFERRED EMBODIMENTS

Some embodiments of the present invention will be described in detail with reference to the accompanying drawings.

Figure 1:
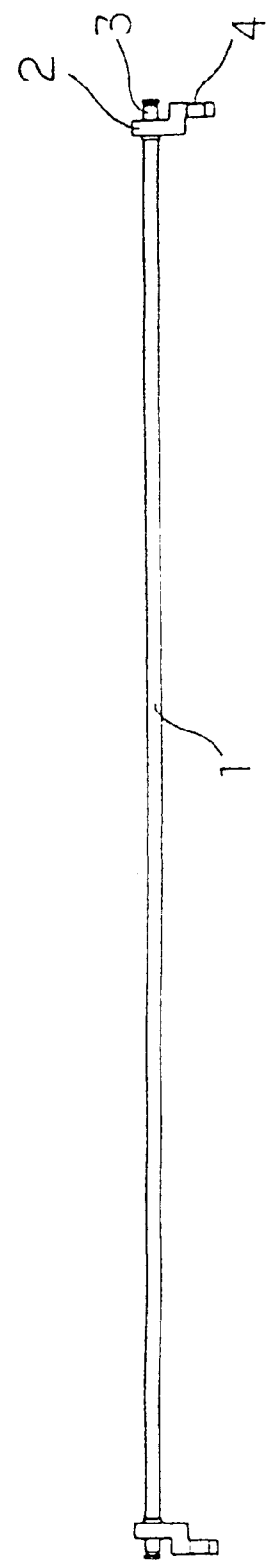
FIG. 1 is a plan view of a belt constituent unit.

FIG. 1 shows a belt constituent unit which constitutes the conveyor belt of the present invention. Reference numeral 1 denotes a rod having a core-sheath structure that consists of a core made of a metal and a plastic sheath with which the core is covered.

Reference numeral 2 denotes a connection piece which is connected integrally to each of the opposite ends of the rod. A connection shaft 3 is formed integrally with one half of the connection piece 2, and a connection hole 4 is formed through the other half of the piece 2. Thus, unlike a conventional conveyor belt, there is no need to use a plurality of connection pieces formed separately from rods, each of which pieces is formed with two connection holes in the longitudinal direction, combine the connection pieces in the longitudinal direction such that the connection holes of the corresponding connection pieces provide common holes, and locate the combined connection pieces at the opposite ends of the belt in its width direction, so that the rods are inserted into the common holes, thereby to assemble the conveyor belt. According to the present embodiment, the conveyor belt can be assembled simply by arranging the belt constituent unit pieces in the longitudinal direction, and sequentially inserting the connection shaft of each of the belt constituent units into the connection hole of its adjacent constituent unit.

As described above, it is not necessary to form the common holes of the connection holes and arrange the combined connection pieces at the opposite ends of the belt as viewed in its width direction. However, the connection shafts may be formed separately from the rods, and inserted into corresponding connection holes after the belt constituent units are combined with each other.

The rod, connection piece, connection shaft and connection hole of the belt constituent unit will be described with reference to the accompanying drawings.

Figure 2:
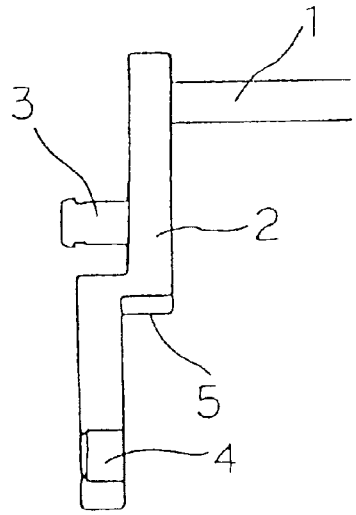
FIG. 2 is an explanatory view showing a part of the belt constituent unit.

FIG. 2 shows one embodiment as a part of a belt constituent unit, wherein a connection shaft 3 is provided on the outer side of an inner portion of a connection piece 2 on which a rod 1 is formed, and a connection hole 4 is formed in an outer portion of the connection piece 2 on which the rod 1 is not formed.

Two belt constituent units are coupled to each other by bringing a cranked stepped portion 5 on the inner side of the belt constituent unit into contact with the inner portion of another connection piece having the same shape, and inserting the connection shaft into the connection hole. An endless conveyor belt is formed by sequentially coupling adjacent belt constituent units with each other.

Figure 3:
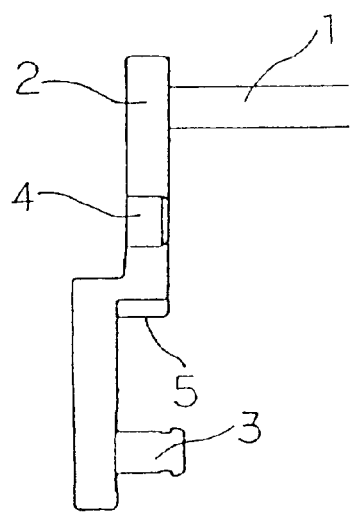
FIG. 3 is an explanatory view showing a part of another belt constituent unit.

FIG. 3 shows another embodiment in which a connection hole 4 is formed in the inner portion of a connection piece 2 to which a rod 1 is joined.

In this embodiment, a connection shaft 3 is provided at the outer portion of the connecting piece 2 to which the rod is not joined. Two belt constituent units are coupled to each other by bringing a cranked stepped portion 5 on the inner side of the belt constituent unit in contact with the inner portion of another connection piece having the same shape, and inserting the connection shaft into the connection hole. An endless conveyor belt is formed by sequentially coupling adjacent belt constituent units with each other.

Figure 4:
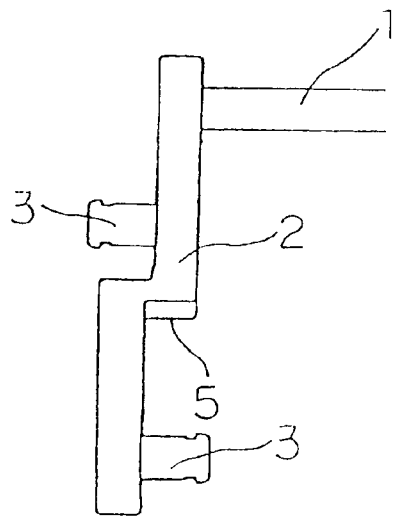
FIG. 4 is an explanatory view showing a part of a still another belt constituent unit.
Figure 5:
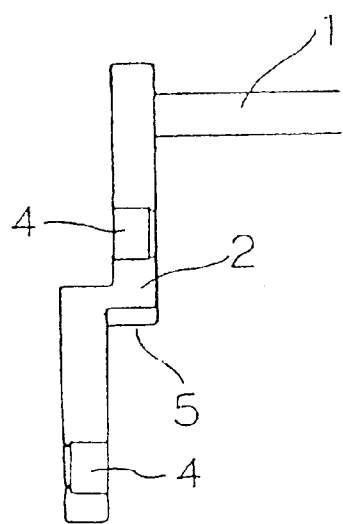
FIG. 5 is an explanatory view showing a part of a further belt constituent unit.

FIG. 4 and FIG. 5 show another embodiment of the present invention. In the belt constituent unit shown in FIG. 4, connection shafts 3 are provided at both of inner and outer portions of a connection piece 2.

In the belt constituent unit shown in FIG. 5, on the other hand, connection holes 4 are formed in both of inner and outer portions of a connection piece 2 that is to be connected to that of FIG. 4. The two belt constituent units of FIG. 4 and FIG. 5 are coupled to each other by bringing a cranked stepped portion 5 on the inner side of the connection piece of FIG. 5 into contact with the inner portion of the connection piece of FIG. 4, and inserting the connection shaft 3 into the corresponding connection hole 4. An endless conveyor belt is formed by sequentially coupling these connection pieces with each other.

Figure 6:
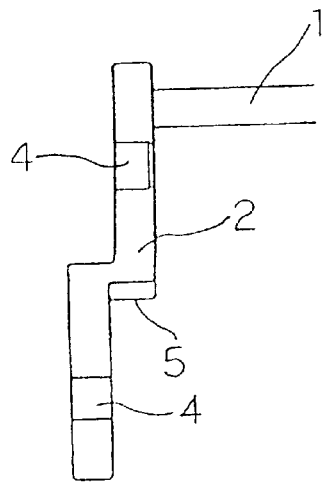
FIG. 6 is an explanatory view showing a part of a still further belt constituent unit.
Figure 7:
FIG. 7 is an explanatory view showing a part of a still further belt constituent unit.

FIG. 6 and FIG. 7 show another embodiment of the present invention. In the belt constituent unit of FIG. 6, connection holes 4 are formed in both of the inner and outer portions of a connection piece 2. Two connection pieces are coupled to each other by bringing a cranked stepped portion 5 on the inner side of the connection piece of FIG. 6 into contact with the inner portion of another connection piece, such that the connection holes 4 of these connection pieces are aligned with each other, and inserting a connection shaft 3 formed as a separate component as shown in FIG. 7, into the connection holes 4 of the connection pieces. An endless conveyor belt is formed by sequentially coupling adjacent connection piece with each other in the above manner.

Figure 8:
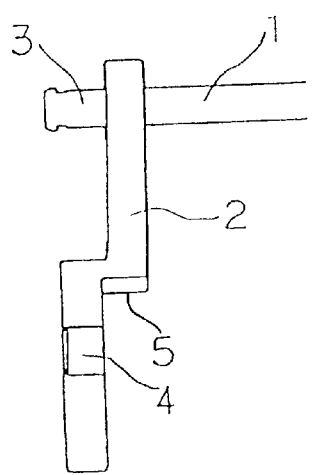
FIG. 8 is an explanatory view showing a part of a still further belt constituent unit.

FIG. 8 shows another embodiment of the present invention, wherein an end portion of a rod 1 is projected outward from the inner portion of a connection piece 2, to thus provide a connection shaft 3. In this embodiment, a separate connection shaft need not be provided.

Two connection pieces are coupled to each other by bringing a cranked stepped portion 5 on the inner side of the connection piece into contact with the inner portion of another connection piece, and inserting the connection shaft 3 into the connection hole 4. An endless conveyor belt is formed by sequentially coupling adjacent connection pieces with each other.

Figure 9:
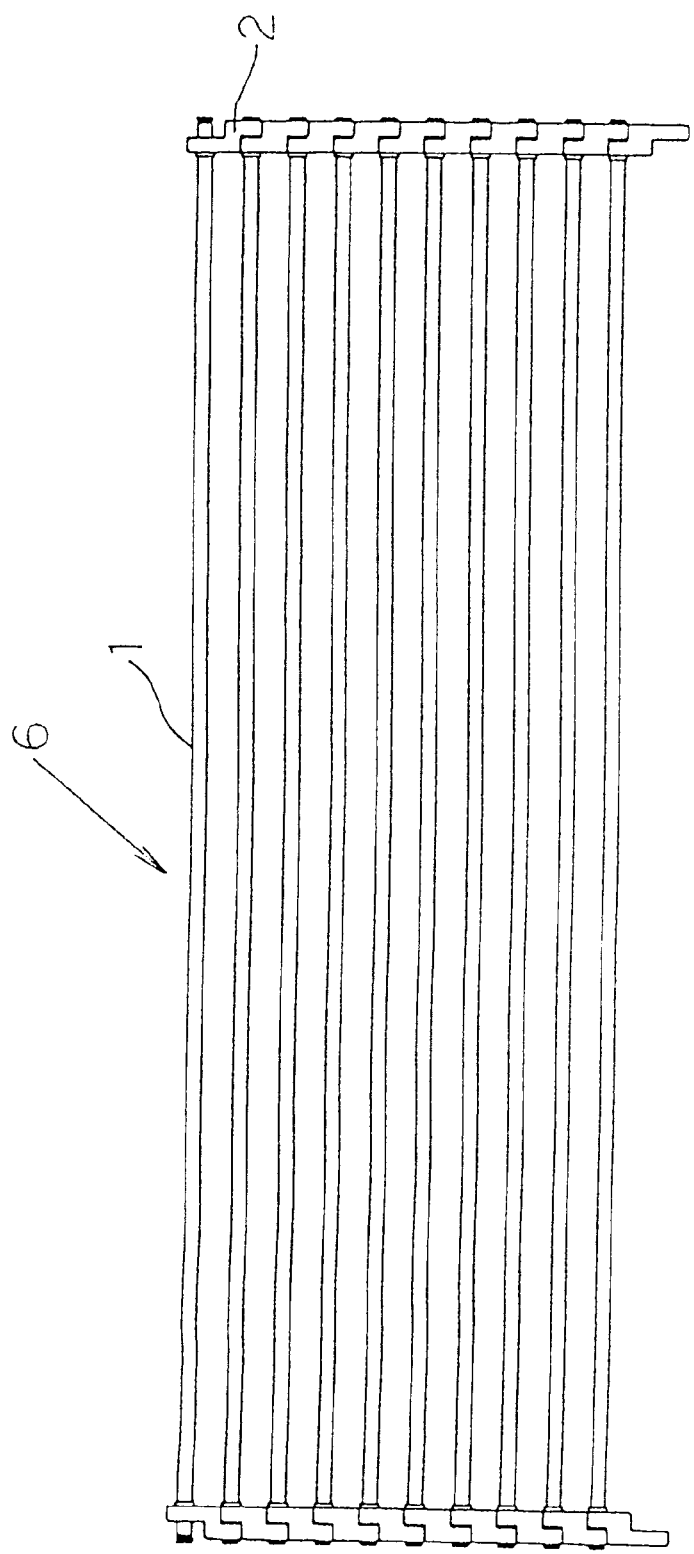
FIG. 9 is an explanatory view showing a straight conveyor belt of the present invention.

FIG. 9 is a plan view of a part of the conveyor belt of the present invention. Reference numeral 6 denotes a conveyor belt, and 1 denotes a rod, while 2 denotes a connection piece.

A belt constituent unit consists of a rod portion 1 and a connection piece 2 which are formed as an integral element, and the connection piece 2 is provided with a connection hole and a connection shaft.

A conveyor belt 6 is formed by arranging the belt constituent units as described above in the longitudinal direction of the belt, that is, in the vertical direction in the figure, and sequentially inserting the connection shaft of the belt constituent unit piece located on the lower side, into the connection hole of the belt constituent unit piece located on the upper side. In this embodiment, the connection shaft in the connection hole and the connection hole are spaced from each other by the same distance, and therefore a straight conveyor belt is formed.

Figure 10:
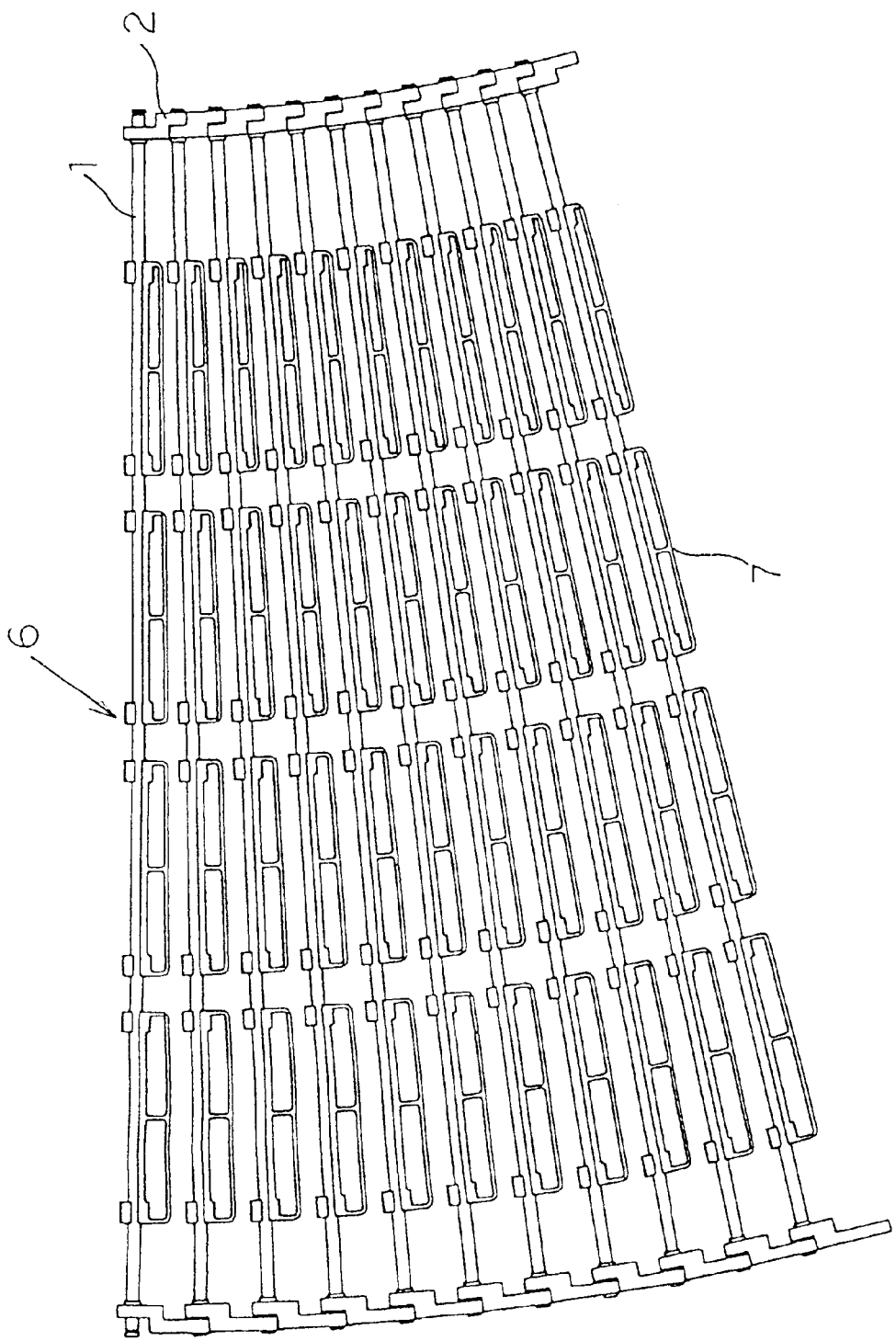
FIG. 10 is an explanatory view showing a curved conveyor belt of the present invention.

FIG. 10 is a plan view showing a part of a conveyor belt according to another embodiment of the present invention.

In the present embodiment, the distance between the connection hole and the connection shaft in the longitudinal direction is reduced on the right-hand side of FIG. 10, and increased on the left-hand side, so as to provide a curved conveyor belt. In this embodiment, four auxiliary conveyor members 7 are attached to the rod portion 1 in the width direction, to form a finely divided conveyor surface, thus making it possible to transport or carry small objects.

In the curved conveyor belt of the present embodiment, the distance between adjacent rod portions becomes larger toward the outer side of the curved shape. The size of the auxiliary conveyor members is made larger as the distance between the rod portions increases, so that the auxiliary members are prevented from being located only in the vicinity of the rods.

The shape of the auxiliary conveyor member is not limited to that of the present embodiment, but may be formed in any suitable shape provided a finely divided conveyance surface can be formed.

Auxiliary rods may be provided to extend over the entire width between the opposite connection pieces, to thus form a finely or closely divided conveyance surface.

Figure 11:
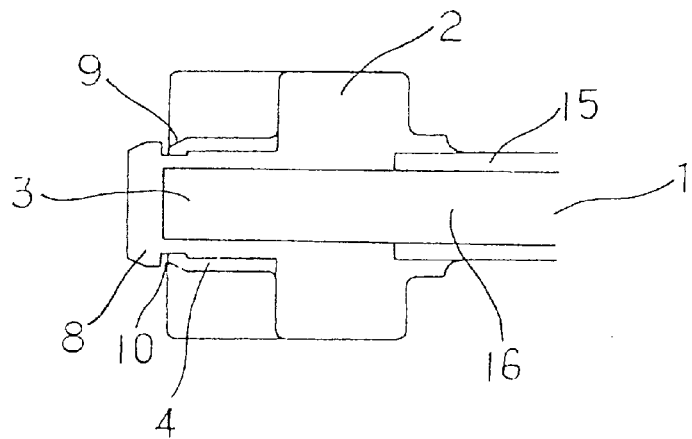
FIG. 11 is an explanatory view showing coupling between a connection shaft and a connection hole.

FIG. 11 is a cross-sectional view useful in explaining the manner in which a connection shaft 3 is inserted into and connected to a connection hole 4. In this example, the connection shaft 3 is formed by a distal end portion of a rod 1, and the rod 1 consists of a sheath 15 and a core 16.

To connect the connection shaft 3 with the connection hole 4, the connection shaft 3 is initially inserted into the connection hole 4 from the right-hand side of FIG. 11 toward the left-hand side.

Although a projecting portion 8 as an end portion of the connection shaft 3 abuts on a projecting portion 9 formed at an end portion of the connection hole 4 during the insertion, the connection shaft 3 is further pushed through the hole 4. That is, the connection shaft is pushed inside until the projecting portion 8 protrudes outward from the connection hole, with both of the projecting portions being compressed and deformed. Since compressive deformation is elastic deformation, the compressed projecting portions restore their original shapes after the projection portion 8 protrudes outward from the connection hole, so that the outside diameter of the projecting portion 8 becomes larger than the inside diameter of the projecting portion 9 of the connection hole. Thus, the connection shaft is prevented from slipping out of the connection hole.

In the present embodiment, the projecting portion 8 is formed such that its diameter decreases toward the distal end portion thereof, and the projecting portion 9 is formed such that its inside diameter decreases toward an end portion thereof, whereby the projecting portions undergo the compressive deformation little by little. With the projecting portions thus formed, the projecting portion 8 of the rod 1 can be easily pushed through the hole 4, with a reduced possibility that the projection portions are chipped or broken.

Needless to say, only one of the projecting portions may be deformed, or both may be deformed.

In the present embodiment, a groove 10 is formed in the inner side of the projecting portion 8 of the connection shaft, so that the projecting portion 9 of the connection hole fits in and engages with this groove.

The formation of the groove 10 makes it possible to increase the compressive deformation of the projecting portion 8 which is inclined toward the right-hand side of FIG. 11 when it is pushed in, and thus makes it easy to push the projecting portion 8 through the connection hole 4.

As a matter of course, the outside diameter of the projecting portion 8 of the connection shaft may not be made larger than the inside diameter of the connection hole, and the projecting portion of the connection hole and the groove of the connection shaft may not be formed.

Figure 12:
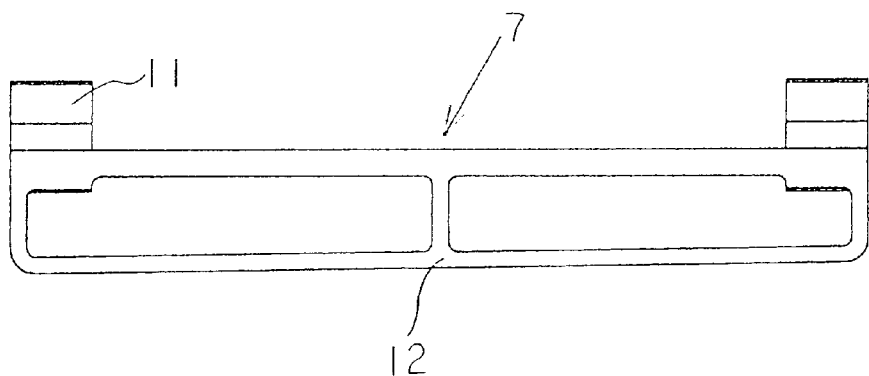
FIG. 12 is a plan view of an auxiliary conveyor member.

FIG. 12 is a plan view of an auxiliary conveyor member 7 mounted in the embodiment shown in FIG. 10. The auxiliary conveyor member consists of a mounting portion 11 and a conveyor portion 12.

Figure 13:
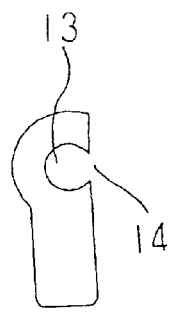
FIG. 13 is an explanatory view of a mounting portion of the auxiliary conveyor member.

FIG. 13 is a side view of the auxiliary conveyor member shown in FIG. 12.

A mounting hole 13 is formed in the mounting portion, and a cut-out 14 is formed at an opening of the mounting hole. The diameter of the mounting hole is equal to or slightly smaller than the diameter of the rod portion, and the auxiliary conveyor member can be attached to the rod portion by one-touch operation by pushing the conveyor member for engagement with the rod. Needless to say, the auxiliary conveyor member may be formed by molding integrally with the belt constituent unit piece when it is formed.

In the present embodiment, the core of the rod is formed of stainless steel, and the sheath is formed of polypropylene, while the connection piece is formed of polyacetal resin.

As explained above, the conveyor belt of the present invention is light in weight, easy to handle, and can be cleaned with high efficiency. Also, the present conveyor belt is free from rust, and can be easily produced by one-touch operation.

Furthermore, the core of the rod portion is prevented from being shifted from its original position, and includes no exposed portion, thus providing a rust-proof rod.

What is claimed is:

1. A conveyor belt formed in an endless shape by sequentially coupling belt constituent units, each of which comprises:
   a cranked plastic connection piece formed by joining horizontal portions of two plates, each plate having an L-shaped cross section such that first and second vertical portions of the two plates are not located on the same side of said joined horizontal portions;
   a rod which is connected integrally with an inner side of said first vertical portion of the connection piece, and has a core-sheath structure consisting of a metal core portion and a plastic sheath portion;
   a connection shaft separate from said rod, provided on one portion of the connection piece; and
   a first connection hole formed in a portion of the connection piece where the connection shaft is not provided,
   wherein said belt constituent units are coupled with each other by bringing said first vertical portion or said second vertical portion of the connection piece of one belt constituent unit into contact with a cranked stepped portion of another connection piece of another belt constituent unit, and inserting the connection shaft into the connection hole such that the connection shaft is freely rotatable.

2. The belt conveyor of claim 1, wherein a projection having a diameter larger than that of the connection hole is formed at a distal end of the connection shaft formed integrally with the connection piece.

3. The conveyor belt of claim 1, wherein the connection piece and the connection shaft are connected to each other by engaging a projecting portion formed on the connection hole of the connection piece with a recessed portion formed in an insertion portion of the connection shaft in such a manner that the connection shaft is freely rotatable.

4. The conveyor belt of claim 1, wherein a projecting portion formed on the connection hole of the connection piece is located at an end portion of the connection hole, and an engaging recessed portion formed in the connection shaft is located at a root of a projection formed at a distal end of the connection shaft.

5. The conveyor belt of claim 1, wherein the connection piece and the connection shaft are connected to each other by engaging a recessed portion formed in the connection shaft with a projecting portion formed on a surface of the connection hole of the connection piece in such a manner that the connection shaft is freely rotatable.

6. The conveyor belt of claim 1, wherein the connecting hole of the connection piece is formed with a projecting portion which is continuous to both a surface that forms the connection hole and a surface of a side face of the connection piece.

7. A conveyor belt which is formed in a curved shape, such that a distance between the connection shaft and the connection hole of the connection piece on the side of one edge of the conveyor as it is defined in claim 1 is made larger than a distance on the side of the other edge of the belt.

8. The conveyor belt of claim 1, wherein the connection piece and the connection shaft are formed as separate members, and a second connection hole is formed at each of inner and outer portions of the connection piece, to allow said connection piece to be combined with the connection shaft.

9. The conveyor belt of claim 8, wherein the connection piece is coupled with the connection shaft formed as a separate member, by inserting one of two protrusions formed in the vicinity of an end portion of the separately formed connection shaft, into the second connection hole, using elastic deformation of at least one of the protrusion and the second connection hole, during insertion of the connection shaft, and sandwiching the connection pieces between the protrusion on the outer side and the protrusion on the inner side such that the connection pieces are freely rotatable.

10. The conveyor belt of claim 1, wherein the rod having the core-sheath structure is formed by inserting a metal rod into a plastic pipe that provides a plastic sheath.

11. A conveyor belt comprising the conveyor belt of claim 1 and a sprocket that engages with the rod of the belt.

12. A plastic connection piece for a conveyor belt, said conveyor belt comprising a plurality of said connection pieces connected by a plurality of separate rods, the connection piece comprising:
   a first and second plastic plate, each plate having a horizontal portion and a vertical portion that are joined at a cranked, stepped portion to form an L-shaped cross section, said horizontal portions being formed together so that said vertical portions are not located on a same side of said joined horizontal portions;
   a plastic connection shaft; and
   a first connection hole, formed in one of said vertical portions, and where said connection shaft is not provided,
   wherein said plastic connection piece is couplable with another plastic connection piece by bringing one of said vertical portions into contact with a cranked stepped portion of said another connection piece, and inserting the plastic connection shaft into the connection hole of said another connection piece, such that the connection shaft is freely rotatable.

13. The plastic connection piece of claim 12, wherein a projection having a diameter larger than that of said connection hole is formed at a distal end of said connection shaft.

14. The plastic connection piece of claim 12, wherein said connection piece and said connection shaft are connected to each other by engaging a projecting portion, formed on a surface that forms said connection hole, with a recessed portion formed in an insertion portion of said connection shaft in such a manner that said connection shaft is freely rotatable.

15. The plastic connection piece of claim 12, wherein a projecting portion is formed on a surface that forms said connection hole of said connection piece, toward an end portion of said connection hole, and a recessed portion that engages with said projecting portion is formed in said connection shaft at a root of a projection formed at a distal end of said connection shaft.

16. The plastic connection piece of claim 12, wherein said connection piece and said connection shaft are connected to each other by engaging a recessed portion formed in said connection shaft with a projecting portion formed on a surface of said connection hole of said connection piece in such a manner that said connection shaft is freely rotatable.

17. The plastic connection piece of claim 12, wherein said connecting hole is formed with a projecting portion which is continuous to both a surface that forms said connection hole and a surface of a side face of said connection piece.

18. The plastic connection piece of claim 12, wherein said connection piece and said connection shaft are formed as separate members, and a second connection hole is formed at each of inner and outer portions of said connection piece, to allow said connection piece to be combined with said connection shaft.

19. The plastic connection piece of claim 18, wherein said connection piece is coupled with said connection shaft by inserting one of two protrusions, formed in the vicinity of an end portion of said connection shaft, into said second connection hole, using elastic deformation of at least one of the protrusion and said second connection hole, during insertion of said connection shaft, and sandwiching said connection piece and another connection piece between the protrusion on the outer side and the protrusion on the inner side such that said connection pieces are freely rotatable.

\* \* \* \* \*